United States Patent [19]

Young

[11] Patent Number: 4,471,572
[45] Date of Patent: Sep. 18, 1984

[54] AUTOMATIC BEAN SPROUTER

[76] Inventor: Robert O. Young, Rm. 3, 2 Fl., No. 56, Alley 11, La. 473, Kung Fu S. Rd., Taipei, Taiwan

[21] Appl. No.: 406,090

[22] Filed: Aug. 6, 1982

[51] Int. Cl.$^3$ ............................................. A01G 31/00
[52] U.S. Cl. ..................................................... 47/61
[58] Field of Search ................... 47/61, 59, 60, 14, 15, 47/16, 62, 63, 64; 251/353; 137/575, 577

[56] References Cited

U.S. PATENT DOCUMENTS

| | | | |
|---|---|---|---|
| 4,037,359 | 7/1977 | Peng et al. | 47/59 |
| 4,092,802 | 6/1978 | Oyama | 47/60 |
| 4,180,941 | 1/1980 | Korematsu | 47/61 |

Primary Examiner—Robert A. Hafer
Assistant Examiner—Bradley M. Lewis
Attorney, Agent, or Firm—Armstrong, Nikaido, Marmelstein & Kubovcik

[57] ABSTRACT

A device for propagating beansprouts or other plants has a container for the beansprouts. One side of the container is substantially covered by a supporting plate which may be in the form of a disc perforated with many tiny holes. A shaft is carried by the supporting plate and extends within a center tube mounted within a water tank. The tube is preferably triangular and has three faces provided with a plurality of spaced-apart holes. The spacing between adjacent holes is greater towards the bottom of the tube. A plurality of small resilient stoppers are lodged within the respective holes in the tube. The growing strength of the beansprouts pushes the supporting plate (upwardly in a preferred embodiment). The shaft, which is carried by the plate, moves within the tube. Projections on the shaft engage the respective stoppers, sequentially dislodging the stoppers, and allowing water to enter through the holes, into the tube, and to pass through the tiny holes in the supporting plate to sprinkle over the beansprouts. As a result, the growing strength of the beansprouts controls the flow of water thereto.

7 Claims, 8 Drawing Figures

AUTOMATIC BEAN SPROUTER

SUMMARY OF THE INVENTION

The present invention is a device for propagating (specifically nursing) sprouting beans such as green beans and soybeans, etc. In order to germinate, nurse and grow beansprouts so successfully, we take advantage of the growing strength of the beans during their growing stage to effect automatic watering, wherein the necessary moisture is controlled for such a specific purpose.

The germination and sprouting process of a bean does not occur on a straight-line of the growth curve. It grows slowly at the initial stage, then grows and spreads rapidly at the final stage. Moreover, it can not survive if long submerged in water, and eventually it will become rotten and smell. Therefore, a sufficient amount of water should be supplied constantly during the short time where it needs moisture so badly, until it reaches full maturity. So far, the previous conventional technique for bean-sprouting mainly relies on manual watering by day and night. However, to effect bean sprouting requires one or half a day's work to finish, and this is particularly hard work. Accordingly, the old-fashioned technique of growing beansprouts is incompatible with modern requirements.

In order to alleviate the above-mentioned well-known shortcoming of manual watering, the present invention provides a new and workable technique for automatic watering in bean sprouting. Accordingly, the structure of the machine disclosed herein is simple and the cost thereof is reasonable. It is suitable for family use or large-scale production. A prime feature of this machine is that it requires no outside power or energy to make bean sprouting automatic.

In accordance with the objects and teachings of the present invention, a preferred embodiment of the machine is disclosed herein. This machine comprises a water tank, a center pipe or tube with multiple holes, a movable supporting board or plate, a shaft fastened by the supporting board and extending to the center pipe, and a container to hold the beans for sprouting. The multiple holes are aligned in the center pipe and can be adjusted to meet difference in temperature, humidity and other elements, free from any fixed arrangement. When operating, the multiple holes are blocked or closed by elastic (or resilient) stoppers. The stoppers inside of the center pipe are circular and have a slight slanting face, that is, of rounded conical shape. It is easy for the projecting part of the shaft in the center tube, when moving with the movable supporting plate along the axis of the shaft, to tap off or dislodge the small stoppers out of the holes in the center tube. By this action, water in the water tank will flow accordingly into the center pipe. Water will thus sprinkle through tiny holes in the supporting plate and over the growing beansprouts, while the excess water will drain out through an outlet in the bottom of the bean sprouting tank. Thus, as the beansprouts grow continually, they push the supporting plate further (upwardly in the preferred embodiment). The shaft is carried by the supporting plate, and the projections on the shaft tap off or dislodge another small stopper. Through this continuing process, the beansprouts receive sufficient regular supplies of water, until they reach full maturity.

BRIEF DESCRIPTION OF THE DRAWINGS

With reference to FIGS. 1–5, the propagation device of the present invention comprises a water tank 1 having a center tube 2 of triangular section, the faces of which are provided with a plurality of holes 21. These holes are lined up orderly, that is, uniformly along the three respective faces. However, as shown in the drawings (particularly FIG. 4 thereof) the spacing or interval between adjacent holes 21 is continually increased towards the lower portion of the tube. By arranging for the successive or adjacent holes to be more dense or greater towards the upper part of the tube, and conversely less dense or sparse towards the lower part of the tube, the whole growing process of the beansprouts is accommodated. Accordingly, an automatic adjustment or flow control is thus provided to meet the difference in elements, temperature and humidity which are vital factors for the growing of beansprouts.

Figure 3:
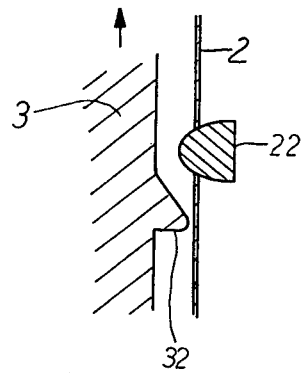
FIG. 3 is an enlarged fragmentary detail of the tube and shaft in vertical section.

Each hole 21 is blocked by a small stopper 22 which is resilient and substantially circular and is removably fixed in the center tube 2. As shown more clearly in FIG. 3, the inner circular surface of the stopper 22 is engaged by the slanted surface of a respective projection 32 formed integrally with a shaft 3 telescopically received within the center tube 2 and movable therein. As a result, the stopper can be tapped off or dislodged from the center tube by the action of the projection 32 on the shaft 3. The line-up of the respective projections 32 on the shaft 3 is matched with the arrangement of the respective holes 21 in the tube 2, thereby dislodging the respective stoppers 22 in an orderly and timely sequence. As a result, the water in tank 1 flows into the center tube 2, then through the gap between the tube 2 and the shaft 3, then passes through a plurality of holes 42 in the supporting plate 4 (see FIG. 1) and finally sprinkles over the beans and beansprouts. Because the overall density of the holes 21 in the center tube 2 increases upwardly, as previously noted, the stoppers 22 in the upper regions of tube 2 are displaced first by the specially-disposed projections 32 on shaft 3; this achieves the desired watering of the bean-sprouts for the whole of the growing period. Accordingly, with this arrangement it will be appreciated that the growth will be slower during the initial stages and faster in the final stage of growing.

Figure 2:
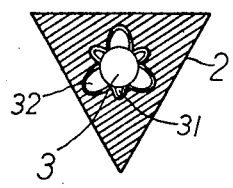
FIG. 2 is a sectional view taken across the center tube and the shaft telescopically received and movable within the tube.

In order to minimize the size of the components and resulting volume for packing and shipping, the shaft 3 is divided into two sections which may be connected together by using joggling machine when needed. The length of each section is substantially identical to that of the tube 2. The upper section is retained against angular displacement by means of three projecting ribs 31 which extend into respective guide grooves in the tube 2, so that the shaft is slidably moveable within the center tube 2 and the barrel thereof. The sectional drawing of FIG. 2 illustrates the shape and relationship of the components. Since the tube 2 and the shaft 3 are not firmly interconnected, the shaft 3 is slidable along its axis within the tube. The base of the shaft has a plug portion 33 which is inserted in a center hole 41 of the supporting plate 4. When the supporting plate (or disc) 4 is pushed upwardly by the growing strength of the beans, the shaft 3 is caused to move concurrently within the center tube 2.

The many tiny holes 42 on the movable supporting plate 4 serve to help the water flow from the holes 21 and through to the beansprouts located between supporting plate 4 and a bottom plate 5. After sufficient water has been supplied, excess water will be drained out through a drain pipe 61 located at the base of the bean sprout tank 6 after first flowing through tiny holes 51 on the bottom plate 5. This arrangement and process is intended to prevent beans and beansprouts from becoming rotten and of an unpleasant smell or odor as a result of being soaked in water too long.

Figure 1:
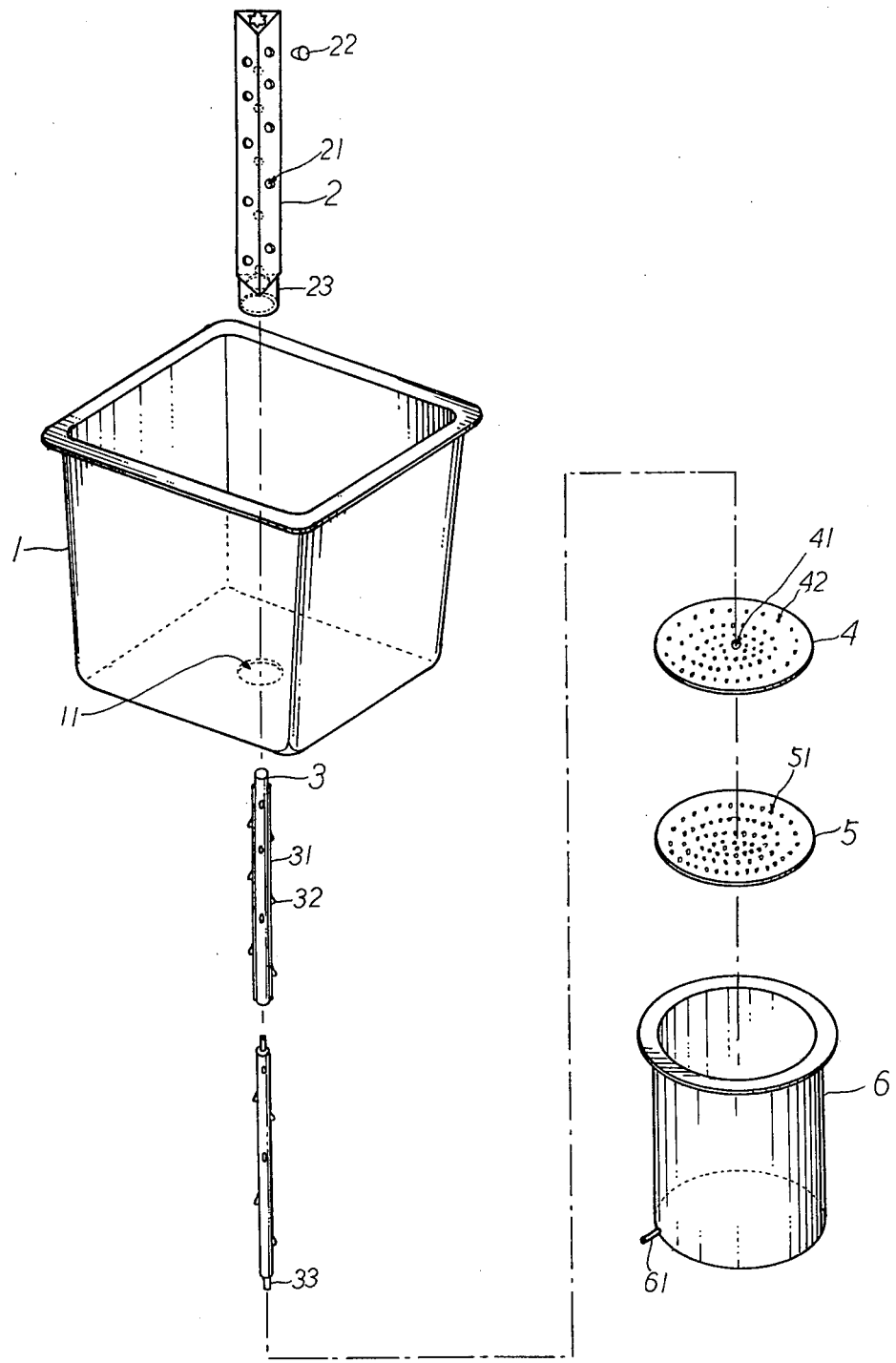
FIG. 1 is an exploded perspective view of a propagating device according to the invention, illustrating the steps of assembly or dismantling.
Figure 4:
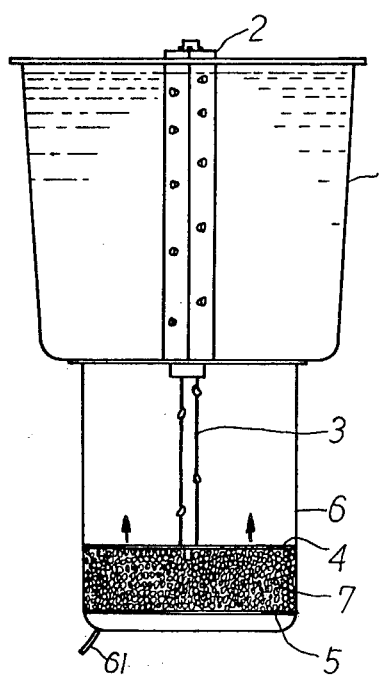
FIG. 4 is a vertical sectional view illustrating the device in the assembled condition.
Figure 5:
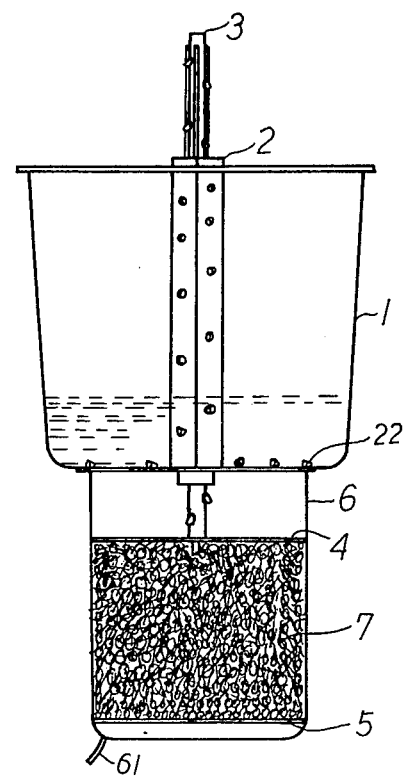
FIG. 5 is a view similar to FIG. 4, but showing a certain stage in the sprouting of beans therein.

FIG. 4 is a sectionalized elevational view of the assembled device of FIG. 1. A tubular part extends from the base of the center tube 2, passes through the base of the water tank and is fastened therein. The beans 7 such as green-beans and soy-beans, etc. are placed in the bean sprouting tank 6 and are located between the supporting plate 4 and the bottom plate 5. When the beans are growing, they push the movable supporting plate 4 upwardly (as shown by the arrows) by the action of their growing strength originating within. Thus, the supporting plate 4 (which carries the shaft 3) moves the shaft axially thereof in the tube 2, thereby enabling the shaft to tap off or displace the small stoppers in the respective holes 21 in the desired order from the top down, and thereby letting the water in the water tank 1 to flow into the tube 2. FIG. 5 is a sectional view of the bean sprouting at a certain developed stage, the displaced stoppers 22 resting on the bottom of the tank 1.

Figure 6:
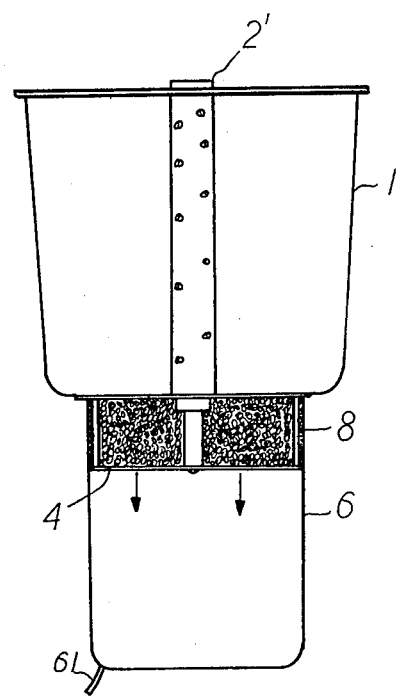
FIG. 6 is a view, partly in elevation and partly in section, of an alternative embodiment of the invention.
Figure 8:
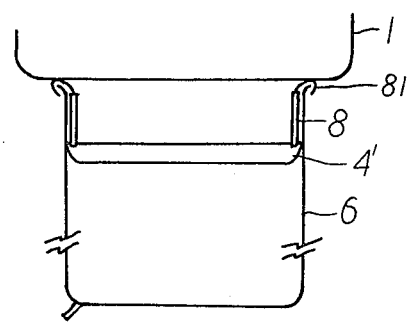
FIG. 8 is a schematic sectional illustration of the embodiment of FIG. 6.

FIG. 6 illustrates an alternate embodiment of the invention, wherein a reversed operation is effected. The water tank 1, movable supporting plate 4, and bean sprouting tank 6 are the same as shown in FIG. 1. The bean sprouting tank 6 has a drain pipe 61 at its base and a hooking device 81 over the top connecting with a retaining elastic band 8. As shown in FIG. 8, the other end of the band is connected with the periphery of the supporting plate 4, so that the whole supporting plate is secured and is resiliently supported in the bean sprouting tank 6.

Figure 7:
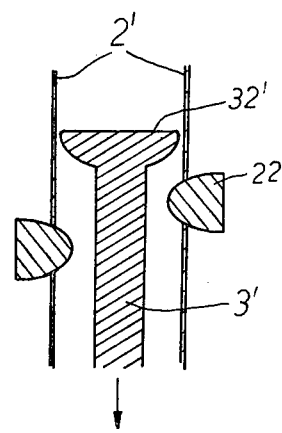
FIG. 7 is an enlarged fragmentary detail in section of the outer tube and displaceable control shaft of the device shown in FIG. 6.

As shown in FIG. 7, the tube 2 is circular in cross-section and is formed or punched with a plurality of orderly aligned apertures or holes. As described previously, the interval between the neighboring holes are lined-up as smaller in the upper part and larger in the lower part. These holes are blocked temporarily with the elastic small stoppers 22. A plate-like surface 32 on the top of the shaft 3 extends laterally and has a slanting lower edge which is circular in section. The water tank top of the beansprouts is too heavy to move when the beansprouts on the supporting plate 4 are growing. The growing action of the beansprouts causes the bands to stretch downwardly and the shaft 3 is moved correspondingly, since it is plugged into and carried by the supporting plate 4. The shaft 3 is caused to move axially in the tube 2, and taps off or displaces the small stoppers 22 from the respective holes 21 step-by-step as the beans sprout. This process enables the water in the water tank to flow under control into the tube and sprinkle over the beansprouts in the growing process while excess water therefrom flows through the holes in the supporting plate and drains out from the drain pipe.

As indicated in FIG. 8, which is an enlarged schematic sectional view of a portion of the device of FIG. 6, the plate 4 takes the place of the moveable supporting plate of the previous embodiment in order to make the loading of the beans more convenient.

With this invention, the length of time may be adjusted automatically to meet the changes of elements, temperature and humidity. As the seeds germinate faster in high temperature, the shaft 3 moves faster to shorten the watering time accordingly. However, during the low temperature season, the watering time will be lengthened. Thus, the movement of the shaft for tapping off or dislodging the small stoppers will be slower at such time and thus saves unnecessary waste.

Various modifications and changes may be made without departing from the scope of the claimed invention.

I claim:

1. A device for propagating beansprouts, comprising a tank for sprouting the beans, a watering system separate from the tank, and means for utilizing the growing strength of the bean sprouting to create an original force to control the watering system without any outside force or effect being required so that water is released into the bean sprouting tank.

2. A device for propagating bean sprouts, comprising a water tank, a tube within the tank, the tube having a plurality of holes from the top to the bottom thereof, a movable supporting plate having a plurality of tiny holes formed therein, a shaft supported by the supporting plate, carried thereby, and extending within said tube and movable therein, a bean sprouting tank to one side of the supporting plate, a plurality of small elastic stoppers received within the respective holes in the tube, projection means carried by the movable shaft and cooperating with the respective stoppers to dislodge said stoppers, sequentially, as the shaft is moved by the supporting plate, whereby water in the water tank flows into the opened holes and into the tube, then through the tiny holes on the supporting plate and sprinkles over the beansprouts during the growing process, and means for draining out excessive water from the bean sprouting tank.

3. The device of claim 2, wherein the tube is triangular in shape and has three faces, wherein the holes are longitudinally alined along the three faces, wherein the spacing between two adjacent holes is greater towards the lower part of the tube, and wherein the upper portion of the shaft is provided with three convex ribs slidably guided within respective slots formed in the tube.

4. The device of claim 2, wherein the tube is circular in cross-section, and wherein the top of the shaft is provided with a laterally-extending plate having a projection surface cooperating with the stoppers to sequentially dislodge the stoppers from the holes in the tube as the shaft moves downwardly within the bean sprouting tank, and wherein hooking parts and elastic bands connect the movable supporting plate to the rim of the bean sprouting tank.

5. The device of claim 4, wherein the movable supporting plate is in the form of a disc.

6. The method of propagating beansprouts or other plants, comprising the steps of providing a container for the beans to sprout, providing a reservoir of water, and utilizing the growing strength of the sprouting beans to automatically control the flow of water from the reservoir to the container.

7. The method of claim 6, wherein the growth of the beansprouts is slower during the initial stages and faster during the final stage of growing.

* * * * *